US012703482B2

(12) United States Patent
Kritzman

(10) Patent No.: US 12,703,482 B2
(45) Date of Patent: Aug. 11, 2026

(54) HOISTING FLIGHT DIRECTOR MODE

(71) Applicant: Rockwell Collins, Inc., Cedar Rapids, IA (US)

(72) Inventor: Alan L. Kritzman, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 129 days.

(21) Appl. No.: 18/732,287

(22) Filed: Jun. 3, 2024

(65) Prior Publication Data

US 2025/0368325 A1 Dec. 4, 2025

(51) Int. Cl.
*B64C 27/82* (2006.01)
*B64C 17/04* (2006.01)
(Continued)

(52) U.S. Cl.
CPC .............. *B64C 27/82* (2013.01); *B64C 17/04* (2013.01); *B64C 27/04* (2013.01); *B66C 13/063* (2013.01);
(Continued)

(58) Field of Classification Search
CPC ......... B64C 17/04; B64C 27/82; B64C 27/04; B66C 13/063; G06T 7/70; G06T 2207/20084; G06T 2207/30252
(Continued)

(56) References Cited

U.S. PATENT DOCUMENTS 6,460,711 B1 * 10/2002 Kato ..................... B66C 13/063 212/275
8,532,846 B2 9/2013 Tollenaere et al.
(Continued)

FOREIGN PATENT DOCUMENTS

CA 2635586 A1 * 7/2007 .............. E02F 3/437
CA 3101109 A1 * 2/2021 ............... B64D 1/22
(Continued)

OTHER PUBLICATIONS

Peng, et al., "Hoist Control Stabilization with Real-Time Gyroscopic Data," 2024 IEEE Integrated STEM Education Conference (ISEC), Princeton, NJ, USA, 2024, pp. 01-08, doi: 10.1109/ISEC61299.2024.10664959 (https://ieeexplore.ieee.org/document/10664959) (Year: 2024).*

(Continued)

*Primary Examiner* — Atul Trivedi
(74) *Attorney, Agent, or Firm* — Suiter Swantz IP

(57) ABSTRACT

A system and method are disclosed and may be used for controlling (e.g., stabilizing) a suspended load. The system may include a hoist, an imaging sensor configured to capture images of a swinging of a load suspended from the hoist, and a controller. The controller may include one or more processors configured to execute a set of program instructions stored in a memory. The program instructions may be configured to cause the one or more processors to receive the images, determine positions of the load over time based on the images, calculate swing data of the swinging of the load based on the positions, determine flight control commands based on the swing data, and direct a flight control system configured to adjust a flight of an aircraft based on the flight control commands.

14 Claims, 4 Drawing Sheets

(51) Int. Cl.

| | |
|---|---|
| ***B64C 27/04*** | (2006.01) |
| ***B66C 13/06*** | (2006.01) |
| ***G06T 7/70*** | (2017.01) |

(52) U.S. Cl.
CPC ...... *G06T 7/70* (2017.01); *G06T 2207/20084* (2013.01); *G06T 2207/30252* (2013.01)

(58) Field of Classification Search
USPC .............................................................. 701/3
See application file for complete search history.

(56) References Cited

U.S. PATENT DOCUMENTS

| | | | | |
|---|---|---|---|---|
| 9,223,008 | B1 * | 12/2015 | Hartman | B66C 13/085 |
| 11,760,486 | B2 | 9/2023 | Azeredo et al. | |
| 11,873,099 | B2 | 1/2024 | Behrens et al. | |
| 2007/0200032 | A1 | 8/2007 | Eadie et al. | |
| 2016/0332851 | A1 * | 11/2016 | Bialkowski | B66C 13/06 |
| 2018/0282130 | A1 | 10/2018 | Kale et al. | |
| 2021/0197970 | A1 * | 7/2021 | Azeredo | B66C 1/40 |
| 2021/0270013 | A1 * | 9/2021 | Nishi | E02F 9/264 |
| 2022/0135378 | A1 * | 5/2022 | Sikora | B66C 13/085 212/273 |
| 2022/0144596 | A1 * | 5/2022 | Liu | B66C 13/063 |
| 2022/0169386 | A1 * | 6/2022 | Behrens | B66C 13/063 |
| 2022/0390963 | A1 * | 12/2022 | Takahashi | G05D 1/695 |
| 2023/0303364 | A1 * | 9/2023 | Sikora | B66C 13/40 |
| 2024/0019246 | A1 * | 1/2024 | Qiu | B64U 10/13 |
| 2025/0368325 | A1 * | 12/2025 | Kritzman | B64C 27/82 |

FOREIGN PATENT DOCUMENTS

| | | | | | |
|---|---|---|---|---|---|
| CA | 2917368 | C | * | 9/2022 | B66C 13/04 |
| CN | 114074892 | A | * | 2/2022 | B66C 13/063 |
| CN | 114812403 | A | * | 7/2022 | G06N 3/045 |
| CN | 115520784 | A | * | 12/2022 | B66C 13/48 |
| CN | 116477474 | A | * | 7/2023 | B66C 13/063 |
| CN | 116588807 | A | * | 8/2023 | B66C 13/063 |
| CN | 117864959 | A | * | 4/2024 | B66C 1/12 |
| CN | 118083793 | A | * | 5/2024 | F15D 1/008 |
| CN | 119461066 | A | * | 2/2025 | |
| DE | 19920431 | A1 | * | 11/2000 | B66C 13/063 |
| DE | 10029579 | A1 | * | 1/2002 | B66C 13/063 |
| DE | 102012106233 | A1 | * | 1/2014 | B64D 45/00 |
| DE | 102013111559 | A1 | * | 4/2015 | B64C 27/04 |
| EP | 4289779 | A1 | * | 12/2023 | B66D 1/54 |
| EP | 4660124 | A1 | * | 12/2025 | B66C 13/46 |
| FI | 20215750 | A1 | * | 8/2022 | B66C 13/063 |
| FR | 2923818 | A1 | * | 5/2009 | G10L 13/00 |
| JP | H08268683 | A | * | 10/1996 | B66C 13/30 |
| JP | 7517071 | B2 | * | 7/2024 | B66C 23/42 |
| TW | 1808548 | B | * | 7/2023 | G01S 17/933 |
| WO | WO-0200543 | A2 | * | 1/2002 | B66C 13/063 |
| WO | WO-0232805 | A1 | * | 4/2002 | B66C 13/063 |
| WO | WO-2020001991 | A1 | * | 1/2020 | B66C 13/063 |
| WO | WO-2020219818 | A1 | * | 10/2020 | B64D 1/22 |
| WO | WO-2021037526 | A1 | * | 3/2021 | G06T 7/70 |
| WO | WO-2021099374 | A1 | * | 5/2021 | H02K 7/1004 |
| WO | WO-2024217825 | A1 | * | 10/2024 | B66C 13/085 |

OTHER PUBLICATIONS

Pizetta, et al., "Load Transportation by Quadrotors in Crowded Workspaces," in IEEE Access, vol. 8, pp. 223941-223951, 2020, doi: 10.1109/ACCESS.2020.3043719 (https://ieeexplore.ieee.org/document/9288712) (Year: 2020).*

Yu, et al., "Hoist Control Stabilization with Real-Time Gyroscopic Data," 2024 IEEE Integrated STEM Education Conference (ISEC), Princeton, NJ, USA, 2024, pp. 01-08, doi: 10.1109/ISEC61299.2024.10664959. (https://ieeexplore.ieee.org/document/10664959) (Year: 2024).*

* cited by examiner

HOISTING FLIGHT DIRECTOR MODE

TECHNICAL FIELD

The present disclosure relates generally to tracking loads suspended from a hoist, and, more particularly, to directing a flight based on tracked loads suspended from a hoist.

BACKGROUND

At least some typical flight directors that control a flight of a helicopter may be designed to hold a helicopter in absolute position coordinates relative to the Earth or hover at a low speed along the ground or water. However, current flight directors are not necessarily conducive for hoisting a load below the vehicle/aircraft, such as in a search and rescue mission. Suspended loads may swing back and forth due to a variety of factors such as winds, ocean waves, vehicle acceleration/deceleration, and/or the like. In such a scenario, pilots may need to disengage or override an automatic flight control system when hoisting to manually stabilize a person or other load being hoisted.

Therefore, there is a need for a system and method that can address one or more of these issues.

SUMMARY

A system is disclosed in accordance with one or more illustrative embodiments of the present disclosure. In one illustrative embodiment, the system may include a hoist. In another illustrative embodiment, the system may include an imaging sensor configured to capture images of a swinging of a load suspended from the hoist. In another illustrative embodiment, the system may include a controller comprising one or more processors configured to execute a set of program instructions stored in a memory. In another illustrative embodiment, the program instructions may be configured to cause the one or more processors to receive the images, determine positions of the load over time based on the images, calculate swing data of the swinging of the load based on the positions, determine flight control commands based on the swing data, and direct a flight control system configured to adjust a flight of an aircraft based on the flight control commands.

In a further aspect, the controller may be configured to utilize a machine learning module to determine the positions. In another aspect, the controller may be further configured to associate each position with a respective time stamp of a respective image to identify a plurality of time stamps associated with the positions. In another aspect, the swing data may include a pendulum period of the load based on the plurality of time stamps. In another aspect, the controller may be further configured to calculate a suspension distance corresponding to a length of a cable suspending the load based on the pendulum period. In another aspect, the controller may be further configured to determine an estimated swing velocity of the load based on the positions, the plurality of time stamps, and the suspension distance. In another aspect, the flight control commands may be based on the estimated swing velocity. In another aspect, the estimated swing velocity may include a lateral swing velocity and a longitudinal swing velocity, and the flight control commands may include target lateral flight control commands based on the lateral swing velocity and target longitudinal flight control commands based on the longitudinal swing velocity. In another aspect, the flight control system may be configured to adjust thrust and control surface inputs of the aircraft based on the target lateral flight control commands and the target longitudinal flight control commands. In another aspect, the determining of the flight control commands may include determining stabilizing target flight control commands to counteract and stabilize the swinging of the load. In another aspect, the determining of the flight control commands may include determining non-zero-velocity target flight control commands configured to cause or maintain a non-zero-relative-velocity of the load relative to the hoist.

A method is disclosed in accordance with one or more illustrative embodiments of the present disclosure. In one illustrative embodiment, the method may include receiving images from an imaging sensor configured to capture images of a swinging of a load suspended from a hoist of an aircraft. In another illustrative embodiment, the method may include determining positions of the load over time based on the images. In another illustrative embodiment, the method may include calculating swing data of the swinging of the load based on the positions. In another illustrative embodiment, the method may include determining flight control commands based on the swing data. In another illustrative embodiment, the method may include directing a flight control system to adjust a flight of an aircraft based on the flight control commands.

In a further aspect, the determining of the positions may be performed via a machine learning module. In another aspect, the method may further include associating each position with a respective time stamp of a respective image to identify a plurality of time stamps associated with the positions. In another aspect, the swing data may include a pendulum period of the load based on the plurality of time stamps. In another aspect, the method may further include calculating a suspension distance corresponding to a length of a cable suspending the load based on the pendulum period. In another aspect, the method may further include determining an estimated swing velocity of the load based on the positions, the plurality of time stamps, and the suspension distance. In another aspect, the flight control commands may be based on the estimated swing velocity. In another aspect, the estimated swing velocity may include a lateral swing velocity and a longitudinal swing velocity, and the flight control commands may include target lateral flight control commands based on the lateral swing velocity and target longitudinal flight control commands based on the longitudinal swing velocity. In another aspect, the flight control system may be configured to adjust thrust and control surface inputs of the aircraft based on the target lateral flight control commands and the target longitudinal flight control commands.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
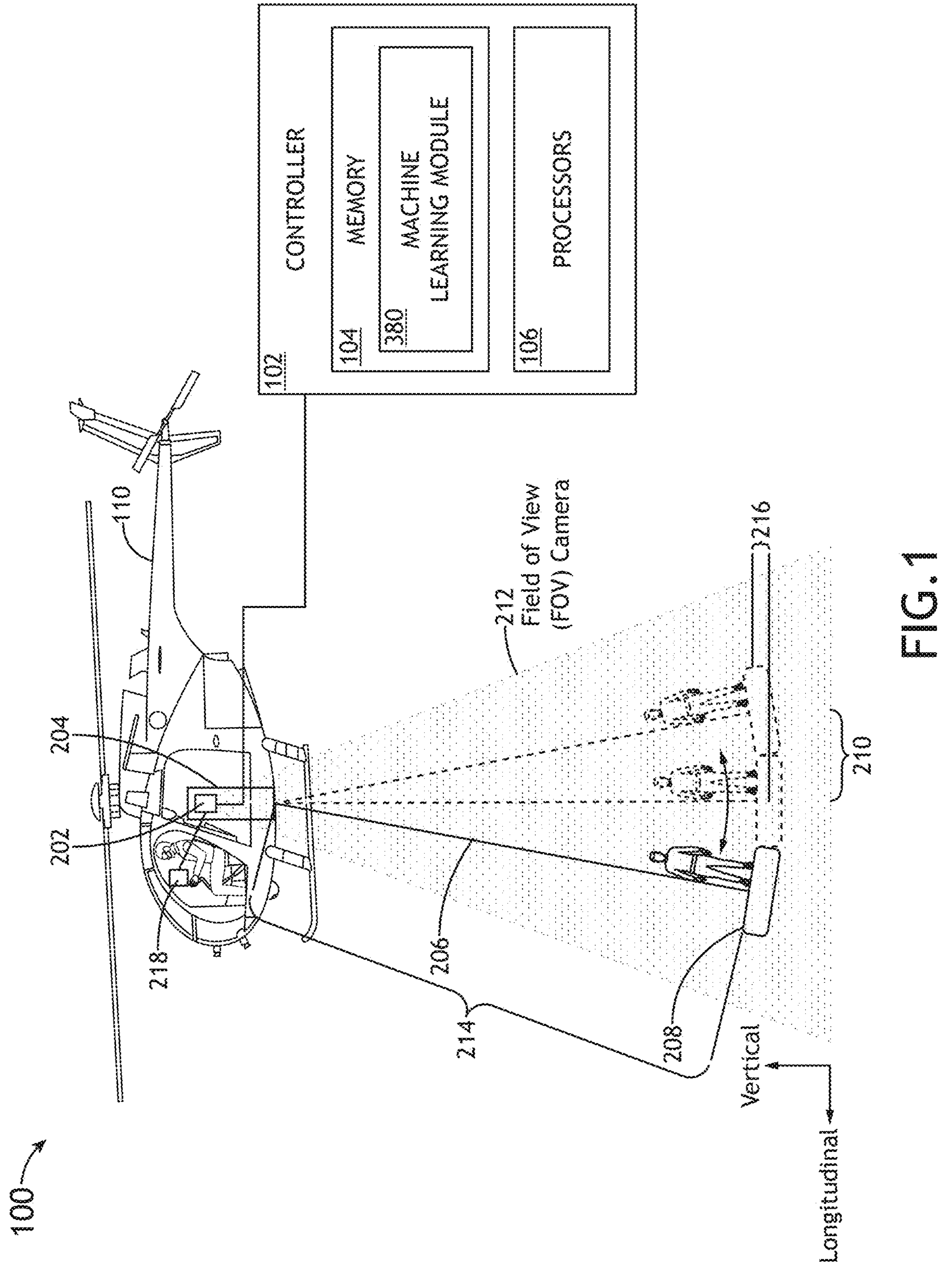
FIG. 1 is a conceptual diagram of a system for stabilizing or controlling a suspended load, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments of the concepts disclosed herein are directed to a system and method for improving the stability and/or control of aircraft (e.g., rotary-wing aircraft such as helicopters) during hoisting operations. The system may include sensors, real-time data processing, and adaptive flight control commands to track and control the position and/or movement of a load.

Embodiments herein may provide a combination of machine learning and sensor technology to manage the complexities of hoisting operations. Embodiments may feature a camera on the hoist feeding live video to a machine learning model, to analyze the movement and swing dynamics of the load. Embodiments may enable the flight director algorithm (e.g., control law of a flight control system) to predict load motion and issue precise control commands for stabilizing the load.

Embodiments may not only adapt to hoisting dynamics, but may enhance safety and efficiency in operations (e.g., critical rescue missions). Benefits may also include reducing the cognitive and physical demands on pilots during such operations.

FIG. 1 illustrates a conceptual diagram of a system 100 for stabilizing or controlling a suspended load 208, in accordance with one or more embodiments of the present disclosure.

The system 100 may include a hoist 204. The hoist 204 may include a cable 206, such as a rope or metal cable. The hoist 204 may be configured to extend and retract the cable 206, such as by using a winch or the like. For example, the hoist 204 may include a body 204 (e.g., housing) with a winch coupled to the cable 206 and supporting the cable 206. An opposite end of the cable 206 may be coupled to a load 208. Any load 208 may be used, such as a platform for rescue missions, a hook, equipment being picked up or dropped off, and/or the like.

The system 100 may include an imaging sensor 202. The imaging sensor 202 may be configured to capture images of a swinging of a load 208 suspended from the hoist 204. The hoist may be configured to be coupled to an aircraft 110. For example, the imaging sensor 202 may be above the cable 206 and positioned (e.g., above) and aimed at the cable 206 such that the imaging sensor 202 is configured to keep the cable 206 in its field of view 212 during operation of the hoist 204. The imaging sensor 202 may be any image sensor such as a multi-pixel sensor (e.g., camera). For instance, the imaging sensor 202 may include, but is not necessarily limited to, an Complementary Metal Oxide Semiconductor (SMOS) sensor configured to convert light into electrical signals. The imaging sensor 202 may, for example, be mounted to the aircraft, such as proximate to (e.g., within 10 feet of) the hoist 204. For instance, the imaging sensor 202 may be a camera positioned to capture images of the hoisting process. For instance, a field of view 212 of the imaging sensor 202 may be angled at the hoist 204 and downwards.

The imaging sensor 202 may be (communicatively) coupled to a controller 102. For example, the imaging sensor 202 may be physically wired to, or configured to wireless communicate with, the controller 102. The controller 102 may include one or more processors 106. The one or more processors 106 may be configured to execute a set of program instructions stored in a memory 104. For example, the controller 102 may be configured to perform one or more steps, such as steps described in method 200 of FIG. 2. The hoist 204 may be considered to include the controller 102, and/or to be coupled to the controller 102.

The system 100 may include a flight control system 218. The flight control system 218 may be configured to control a flight of the aircraft 110, such as by adjusting control surfaces, throttle of one or more engines, and/or the like to adjust the flight. For instance, the flight control system 218 may be configured, when set in an automatic mode, to adjust the flight according to a target lateral and longitudinal velocity for the aircraft 110. It is contemplated herein that target velocity inputs (or the like) may be used to automatically adjust the flight of the aircraft 110 to control based on the swinging of the load 208. For instance, the swinging velocity of the load 208 may be cancelled out (automatically) using the flight control system 218 if proper target velocities are input and the flight is adjusted at a proper time to cancel out the direction of the swing of the load 208.

The aircraft 110 may be any aircraft. For example, the aircraft 110 may include (or be) a rotary-wing aircraft. For example, the aircraft 110 may include (or be) an aircraft configured to hover. For instance, the aircraft 110 may include (or be) a helicopter.

For instance, in some embodiments, the aircraft target velocity may be increased in a same direction, at the same time period, that the load 208 is swinging in that direction. An amount of target velocity may be proportional to the maximum (relative swinging) velocity of the load 208.

Figure 2:
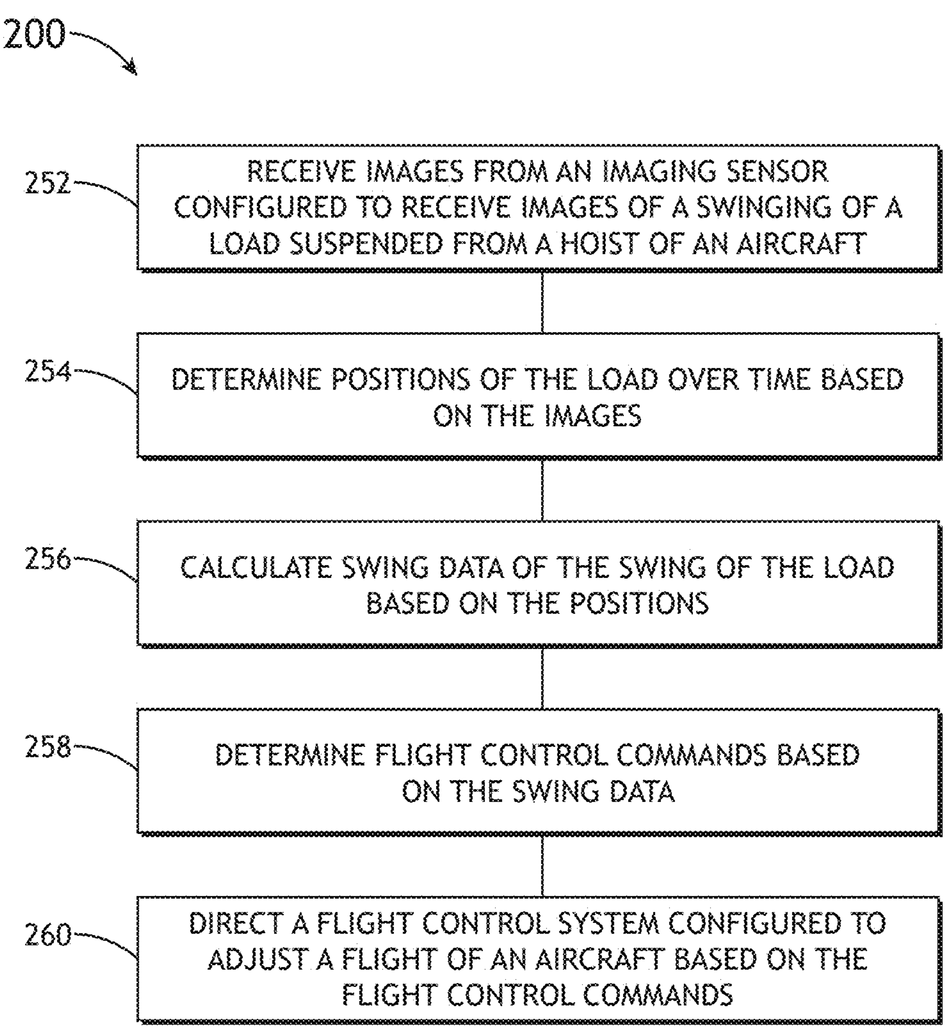
FIG. 2 is a flow diagram illustrating steps performed in a method for stabilizing or controlling a suspended load, in accordance with one or more embodiments of the present disclosure.

FIG. 2 illustrates a flow diagram illustrating steps performed in a method 200, in accordance with one or more embodiments of the present disclosure. The method may, but is not necessarily required to be, performed using the system 100. For example, the controller 102 may be configured to perform the steps of the method 200 using program instructions stored on memory 104. However, one may realize that the method may be carried out by a variety of one or more systems.

At step 252, images are received from the imaging sensor 202 configured to receive the images. For example, the controller 102 may receive the images on memory 104 for analysis by the processors 106.

At step 254, positions of the load 208 are determined over time based on the images. Such analysis may include processing via machine learning, neural network algorithms. For example, the controller 102 may be configured to utilize a machine learning module 380 to determine the positions. In this way, the determining of the positions may be performed via a machine learning module 380.

The controller 102 may be configured to associate each position with a respective time stamp of a respective image to identify a plurality of time stamps associated with the positions. For instance, the controller 102 may know where the load 208 is over time in the images, and use this to determine the start and stop of a pendulum period.

At step 256, swing data is calculated of the swing of the load 208 based on the positions. Further, for example, the time stamps of the images associated with the images may be used to calculate the pendulum period of the pendulum swinging. For instance, whenever the positions change direction and/or stop moving in one direction, may indicate the start of the pendulum period. This analysis may be performed (independently) in both the lateral and longitudinal directions. For instance, the longitudinal direction may be the direction aligned with a forward direction of travel of the aircraft 110.

In theory, for a simple pendulum, the pendulum period (T) of a pendulum is independent of the mass of the pendulum load 208. For example, the period could be a left-to-right period along the longitudinal direction or the like.

This theory may be exploited to calculate data based on known information. For example, swing data may include, but is not necessarily limited to, pendulum period, suspension distance, and maximum velocity.

For example, the controller 102 may be configured to calculate a suspension distance 214 corresponding to a length of the cable 206 suspending the load 208 based on the calculated pendulum period. For instance, the suspension distance 214 (L) may be determined based on an equation of the form:

$$L = (T/2\pi)^2 \times g \qquad \text{(Eq. 1)}$$

where L is the suspension distance 214, T is the pendulum period (e.g., in seconds), and g is the acceleration due to gravity (e.g., 9.8 $m/s^2$) of the load 208.

The controller 102 may be further configured to determine an estimated swing velocity of the load 208 based on the positions, the time stamps, and the suspension distance 214 (L). For example, a maximum velocity may be determined based on an equation of the form:

$$v = \sqrt{2gh} \qquad \text{(Eq. 2)}$$

where v is the velocity (e.g., maximum pendulum velocity) of the load 208, and h represents a vertical height change 216 of the load 208 above its lowest point of the swing.

Since h 216 is not necessarily readily known from the images themselves, an estimation may be used for h 216. For example, an estimation based on the suspension distance 214 (L) and an observed maximum and minimum positions of the load 208 over at least one pendulum period may be utilized. This estimation may be specific to the image sensor setup and installation parameters. For example, horizontal and vertical pixel positions (e.g., centroid positions) of bounding boxes 420 of FIG. 4 may be used to determine h 216.

To estimate h 216 of the load 208 above its lowest point of the swing, we may utilize an equation of a form similar to:

$$h=L-\sqrt{L^2-x^2}$$

(or the like), where x is the horizontal displacement 210 (see FIG. 2) of the load 208 from its equilibrium position. This can be performed individually for x in a longitudinal direction and also in the lateral direction, such as for x-direction pixels and y-direction pixels in each image. As noted, this may need to be calibrated for the specific image sensor 202 and setup of a particular system 100 configuration. For instance, the pixel distances may be calibrated to real-world distances (e.g., meters) for given suspension distances 214.

At step 258, flight control commands are determined based on the swing data.

In some embodiments, the flight control commands may be based on the estimated swing velocity. For example, the flight control commands may include (or be derived from or indicative of) a target velocity. For stabilizing the load, the target velocity may be configured to increase a velocity of the aircraft 110 in a same direction, at a same time period, that the load 208 is swinging in that direction. An amount of target velocity may be proportional to the maximum (relative swinging) velocity of the load 208. For example, the maximum pendulum velocity (v) may be solved for above and used as the maximum relative swinging velocity of the load 208. For example, if the aircraft 110 is statically hovering and the load 208 is about to swing forward in the longitudinal direction, a target longitudinal flight control command may be sent to cause the aircraft 110 to accelerate its velocity forward, at least for some period of time. Moving the aircraft 110 in the direction of the swinging may cause a reduction in swinging. These steps may be repeated as desired. For instance, if the swing is faster than the acceleration capabilities of the aircraft 110, then the acceleration and deceleration in a forward and backward direction may be repeated for each swing forward and backward. This may also be performed any number of times in the lateral direction. For example, the flight control commands may include target longitudinal flight control commands and target lateral flight control commands, and these may be configured to be performed at any time as desired. For example, they may be performed simultaneously, semi-overlapping in time, sequentially, and/or the like.

Note that in the case where an aircraft 110 is moving along with the load 208, and the load 208 is swinging, the aircraft 110 may speed up and slow down to stabilize the load, without necessarily needing to change direction backwards.

The system 100 may be configured to perform any number of the steps of the method 200 continuously. For example, unpredictable forces may constantly be creating swinging motions that needed to be actively counteracted to achieve stability.

The estimated swing velocity may include a lateral swing velocity and a longitudinal swing velocity. The flight control commands may include target lateral flight control commands based on the lateral swing velocity. The flight control commands may include target longitudinal flight control commands based on the longitudinal swing velocity.

The target flight control commands may be relative to any reference, such as relative to the aircraft 110.

The determining of the flight control commands may include determining stabilizing target flight control commands to counteract and stabilize the swing of the load 208 (relative to the aircraft 110). As noted, moving the aircraft 110 in the direction of the swinging may cause a reduction in swinging. However, note that any command may be used for any desired effect on the aircraft 110 or load 208.

The determining of the flight control commands may include non-zero-velocity target flight control commands configured to cause or maintain a non-zero-relative-velocity of the load 208 relative to the hoist 204. For example, rather than stabilizing the load relative to the aircraft 110, the load 208 may be desired to be stabilized relative to a different moving platform (e.g., aircraft carrier, boat, another vehicle, or the like). In another example, the load may be desired to be stabilized to nothing and "thrown" towards a destination, such as swinging the load 208 towards personnel ready to "catch" the load 208 or repeatedly swinging the load 208 towards a destination, like a wrecking ball motion.

At step 260, a flight control system 218 is directed to adjust a flight of the aircraft 110 based on the flight control commands. For example, the controller 102 may send a transmission to the flight control system 218. For instance, the transmission may be encoded commands or the like. For instance, the transmission may include program instructions or API requests of the flight control commands or the like.

The flight control system 218 may be configured to adjust thrust and control surface inputs of the aircraft 110 based on the target lateral flight control commands and the target longitudinal flight control commands.

Typical systems may use a control law or the like to adjust collective inputs of the aircraft 110 to maintain target speeds in two directions. Embodiments of the present disclosure may add (and/or alter) functionality of the aircraft 110 to enable controlling a suspended load. The method 200 herein may be configured to be "engaged" by a user. For example, the user may turn on a switch or press an option on a screen or the like of the aircraft 110, to turn on a load control mode of method 200. The load control mode may automatically perform the functionalities described herein. In some embodiments, the controller 102 may be configured for the control law may to return from (e.g., halt) a load control mode, and return to a (standard) user-commanded hover speed mode.

The timing of the flight control commands execution affects the swinging.

The controller 102 may be configured to determine the timing, such as at what specific future time the flight control commands are to be executed (or transmitted) and/or any delays in controlling of the aircraft 110. For example, the controller 102 may account for a processing latency and inertial characteristics of a helicopter and its control system. For instance, the controller 102 may be configured to account for delays in when the aircraft 110 actually accelerates in the real world based on flight control commands. The delays may be known (e.g., stored on memory 104). For instance, the delays may be measured and recorded based on historical data, simulated, and/or the like.

In some embodiments, a timing of flight control commands (e.g., when to accelerate the aircraft 110) may be, but is not necessarily required to be, included in the flight control commands. For example, the timing (e.g., specific future time) may be explicitly indicated in the flight control commands. In another example, the timing may be controlled/determined by controlling when the flight control commands are transmitted.

Figure 3:
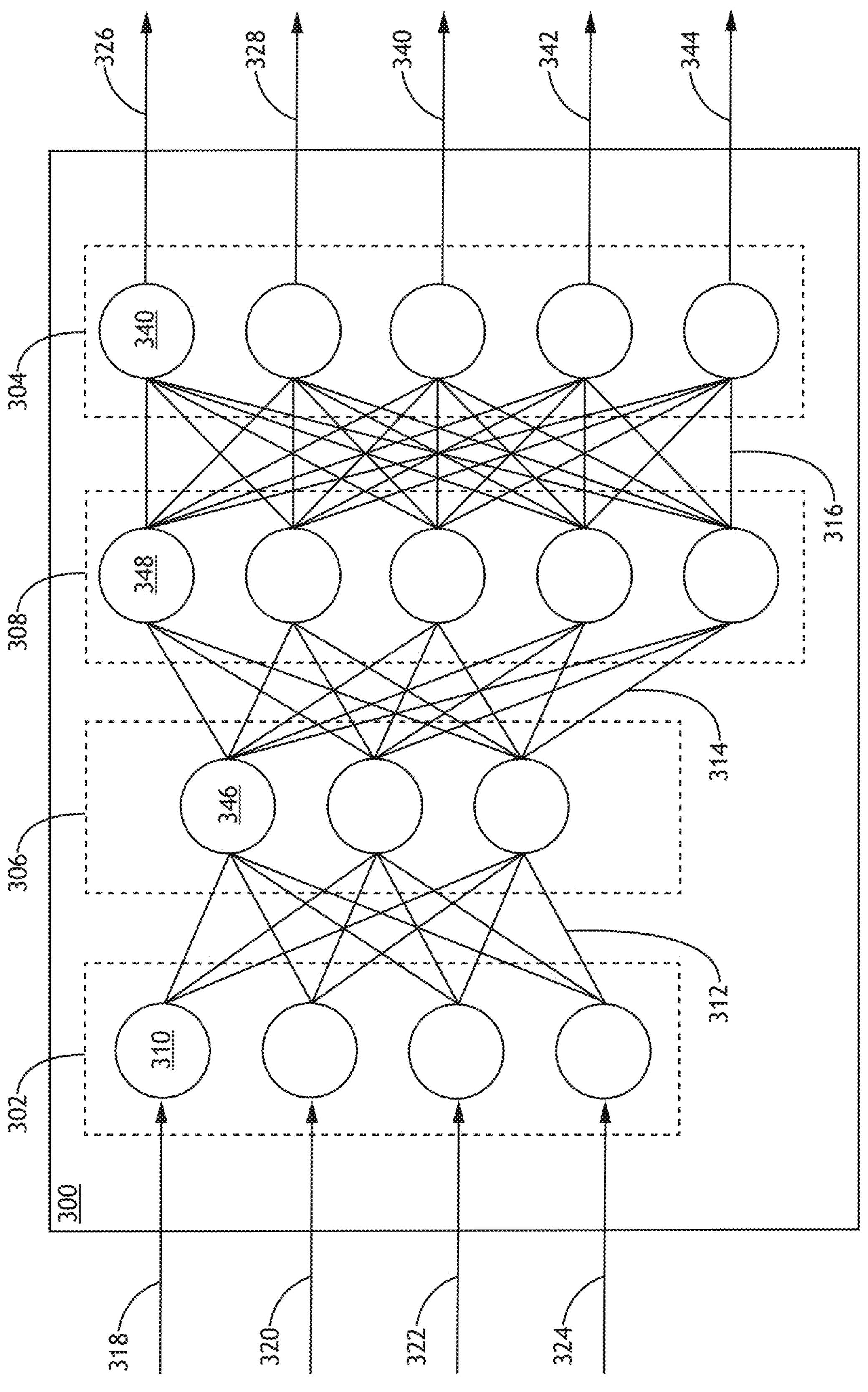
FIG. 3 is a block diagram of a neural network, in accordance with one or more embodiments of the present disclosure.

FIG. 3 illustrates a block diagram of a neural network 300 of a machine learning module 380, in accordance with one or more embodiments of the present disclosure.

Referring to FIG. 3, a block diagram of a neural network 300 according to one or more embodiments disclosed herein is shown.

A module may be any software and/or hardware configured to output data. For example, a module may be code or data, such as python code, C++ code, weights of a neural network, etc. For instance, the module may be a function in an application, a standalone application, a combination of applications, or the like. The machine learning module 380 may be configured to utilize a neural network, such as a program configured to input values and receive values from a neural network such as neural network 300.

A neural network 300 may be any neural network. For example, object detection methods may be used such as, but not necessarily limited to, as R-CNN, YOLO, or TensorFlow. At least some of these may process video images and return a name of an object detected as well as positioning of a bounding box of the object.

The neural network 300 comprises an input layer 302 that receives external inputs (images, pixel data of images, tokenized images, etc.) and an output layer 304, and a plurality of internal layers 306, 308. Each layer comprises a plurality of neurons or nodes 310, 336, 338, 340. In the input layer 302, each node 310 receives one or more inputs 318, 320, 322, 324 corresponding to a digital signal and produces an output 312 based on an activation function unique to each node 310 in the input layer 302. An activation function may be a hyperbolic tangent function, a linear output function, and/or a logistic function, or some combination thereof, and different nodes 310, 336, 338, 340 may utilize different types of activation functions. In at least one embodiment, such activation function comprises the sum of each input multiplied by a synaptic weight. The output 312 may comprise a real value with a defined range or a Boolean value if the activation function surpasses a defined threshold. Such ranges and thresholds may be defined during a training process. Furthermore, the synaptic weights are determined during the training process.

Outputs 312 from each of the nodes 310 in the input layer 302 are passed to each node 336 in a first intermediate layer 306. The process continues through any number of intermediate layers 306, 308 with each intermediate layer node 336, 338 having a unique set of synaptic weights corresponding to each input 312, 314 from the previous intermediate layer 306, 308. It is envisioned that certain intermediate layer nodes 336, 338 may produce a real value with a range while other intermediate layer nodes 336, 338 may produce a Boolean value. Furthermore, it is envisioned that certain intermediate layer nodes 336, 338 may utilize a weighted input summation methodology while others utilize a weighted input product methodology. It is further envisioned that synaptic weight may correspond to bit shifting of the corresponding inputs 312, 314, 316.

An output layer 304 including one or more output nodes 340 receives the outputs 316 from each of the nodes 338 in the previous intermediate layer 308. Each output node 340 produces a final output 326, 328, 330, 332, 334 via processing the previous layer inputs 316, the final output 326, 328, 330, 332, 334 may correspond to a position, bounding box, or the like. For instance, the final output 326, 328, 330, 332, 334 may be a heatmap of likely location, pixel coordinates of a bounding box, a single X-Y coordinate of a center of a load, and/or the like. Such outputs may comprise separate components of an interleaved input signal, bits for delivery to a register, or other digital output based on an input signal and DSP algorithm.

In at least one embodiment, each node 310, 336, 338, 340 in any layer 302, 306, 308, 304 may include a node weight to boost the output value of that node 310, 336, 338, 340 independently of the weighting applied to the output of that node 310, 336, 338, 340 in subsequent layers 304, 306, 308. It may be appreciated that certain synaptic weights may be zero to effectively isolate a node 310, 336, 338, 340 from an input 312, 314, 316, from one or more nodes 310, 336, 338 in a previous layer, or an initial input 318, 320, 322, 324.

In at least one embodiment, the number of processing layers 302, 304, 306, 308 may be constrained at a design phase based on a desired data throughput rate. Furthermore, multiple processors and multiple processing threads may facilitate simultaneous calculations of nodes 310, 336, 338, 340 within each processing layers 302, 304, 306, 308.

Layers 302, 304, 306, 308 may be organized in a feed forward architecture where nodes 310, 336, 338, 340 only receive inputs from the previous layer 302, 304, 306 and deliver outputs only to the immediately subsequent layer 304, 306, 308, or a recurrent architecture, or some combination thereof.

Figure 4:
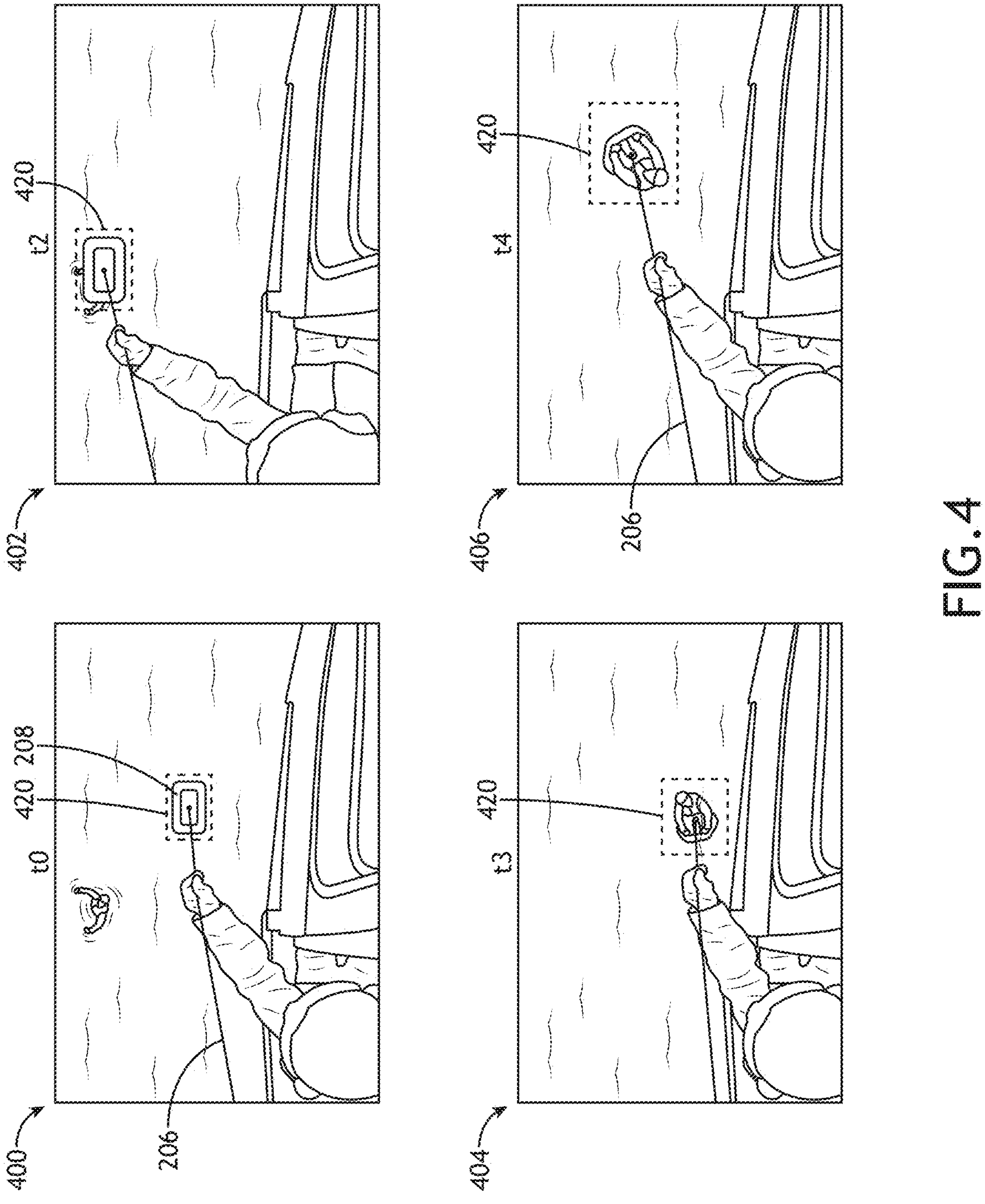
FIG. 4 illustrates a set of images including bounding boxes indicating positions of the load over time, in accordance with one or more embodiments of the present disclosure.

FIG. 4 illustrates a set of images 400, 402, 404, 406 including bounding boxes 420 indicating positions of the load 208 over time, in accordance with one or more embodiments of the present disclosure.

The bounding boxes 420, in some examples may be used to determine the position of the load 208 over a set of time stamps ($t_1$, $t_2$, $t_3$, $t_4$, . . . $t_n$) corresponding to the images.

Components are discussed in more detail below, in accordance with one or more embodiments of the present disclosure.

The one or more processors 106 of controller 102 may include any one or more processing elements known in the art. In this sense, the one or more processors 106 may include any microprocessor device configured to execute algorithms and/or instructions. In one embodiment, the one or more processors 106 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term “processor” may be broadly defined to encompass any device having one or more processing elements, which execute program instructions from a non-transitory memory medium (e.g., memory 104). Moreover, different subsystems of the system 100 may include processor or logic elements suitable for carrying out at least a portion of the steps described throughout the present disclosure. Therefore, the above description should not be interpreted as a limitation on the present invention but merely an illustration.

The memory medium 104 may include any storage medium known in the art suitable for storing program instructions executable by the associated one or more processors 106. For example, the memory medium 104 may include a non-transitory memory medium. For instance, the memory medium 104 may include, but is not limited to, a read-only memory, a random access memory, a magnetic or optical memory device (e.g., disk), a magnetic tape, a solid state drive and the like. In another embodiment, it is noted herein that the memory 104 is configured to store one or more results from the system 100 and/or the output of the various steps described herein. It is further noted that memory 104 may be housed in a common controller housing with the one or more processors 106. In an alternative embodiment, the memory 104 may be located remotely with respect to the physical location of the processors and controller 102. For instance, the one or more processors 106 of controller 102 may access a remote memory (e.g., server), accessible through a network (e.g., internet, intranet and the like). In another embodiment, the memory medium 104 stores the program instructions for causing the one or more processors 106 to carry out the various steps described through the present disclosure.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored “permanently,” “semi-permanently,” temporarily, or for some period of time. For example, the storage medium may be random access memory (RAM), and the results may not necessarily persist indefinitely in the storage medium.

In another embodiment, the controller 102 of the system 100 may be configured to receive and/or acquire data or information from other systems by a transmission medium that may include wireline and/or wireless portions. In another embodiment, the controller 102 of the system 100 may be configured to transmit data or information (e.g., the output of one or more processes disclosed herein) to one or more systems or sub-systems by a transmission medium that may include wireline and/or wireless portions. In this manner, the transmission medium may serve as a data link between the controller 102 and other subsystems of the system 100. Moreover, the controller 102 may send data to external systems via a transmission medium (e.g., network connection).

In another embodiment, the system 100 includes a user interface. In one embodiment, the user interface is communicatively coupled to the one or more processors 106 of controller 102. In another embodiment, the user interface device may be utilized by controller 102 to accept selections and/or instructions from a user. In some embodiments, described further herein, a display may be used to display data to a user (not shown). In turn, a user may input, via user input device, a selection and/or instructions responsive to data displayed to the user via the display device.

The user interface device may include any user interface known in the art. For example, the user input device of the user interface may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface device, those skilled in the art should recognize that a large number of touchscreen interface devices may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

The display device may include any display device known in the art. In one embodiment, the display device may include, but is not limited to, a liquid crystal display (LCD). In another embodiment, the display device may include, but is not limited to, an organic light-emitting diode (OLED) based display. In another embodiment, the display device may include, but is not limited to a CRT display. Those skilled in the art should recognize that a variety of display devices may be suitable for implementation in the present invention and the particular choice of display device may depend on a variety of factors, including, but not limited to, form factor, cost, and the like. In a general sense, any display device capable of integration with a user input device (e.g., touchscreen, bezel mounted interface, keyboard, mouse, trackpad, and the like) is suitable for implementation in the present invention.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system comprising:

a hoist;

an imaging sensor configured to capture images of a swinging of a load suspended from the hoist; and a controller comprising one or more processors configured to execute a set of program instructions stored in a memory, the set of program instructions configured to cause the one or more processors to:

receive the images;

determine positions of the load over time based on the images;

associate each position with a respective time stamp of a respective image to identify a plurality of time stamps associated with the positions;

calculate swing data of the swinging of the load based on the positions, wherein the swing data comprises a pendulum period of the load based on the plurality of time stamps;

calculate a suspension distance corresponding to a length of a cable suspending the load based on the pendulum period;

determine flight control commands based on the swing data; and direct a flight control system configured to adjust a flight of an aircraft based on the flight control commands.

2. The system of claim 1, wherein the controller is configured to utilize a machine learning module to determine the positions.

3. The system of claim 1, wherein the controller is further configured determine an estimated swing velocity of the load based on the positions, the plurality of time stamps, and the suspension distance.

4. The system of claim 3, wherein the flight control commands are based on the estimated swing velocity.

5. The system of claim 4, wherein the estimated swing velocity comprises a lateral swing velocity and a longitudinal swing velocity, wherein the flight control commands comprise:

target lateral flight control commands based on the lateral swing velocity; and target longitudinal flight control commands based on the longitudinal swing velocity.

6. The system of claim 5, wherein the flight control system is configured to adjust thrust and control surface inputs of the aircraft based on the target lateral flight control commands and the target longitudinal flight control commands.

7. The system of claim 5, wherein the determining of the flight control commands comprises determining stabilizing target flight control commands to counteract and stabilize the swinging of the load.

8. The system of claim 4, wherein the determining of the flight control commands comprises non-zero-velocity target flight control commands configured to cause or maintain a non-zero-relative-velocity of the load relative to the hoist.

9. A method comprising:

receiving images from an imaging sensor configured to capture images of a swinging of a load suspended from a hoist of an aircraft;

determining positions of the load over time based on the images;

associating each position with a respective time stamp of a respective image to identify a plurality of time stamps associated with the positions;

calculating swing data of the swinging of the load based on the positions, wherein the swing data comprises a pendulum period of the load based on the plurality of time stamps;

calculating a suspension distance corresponding to a length of a cable suspending the load based on the pendulum period;

determining flight control commands based on the swing data; and directing a flight control system to adjust a flight of an aircraft based on the flight control commands.

10. The method of claim 9, wherein the determining of the positions is performed via a machine learning module.

11. The method of claim 9, further comprising determining an estimated swing velocity of the load based on the positions, the plurality of time stamps, and the suspension distance.

12. The method of claim 11, wherein the flight control commands are based on the estimated swing velocity.

13. The method of claim 12, wherein the estimated swing velocity comprises a lateral swing velocity and a longitudinal swing velocity, wherein the flight control commands comprise:

target lateral flight control commands based on the lateral swing velocity; and target longitudinal flight control commands based on the longitudinal swing velocity.

14. The method of claim 13, wherein the flight control system is configured to adjust thrust and control surface inputs of the aircraft based on the target lateral flight control commands and the target longitudinal flight control commands.

* * * * *